United States Patent
Barnett et al.

(10) Patent No.: US 10,452,898 B2
(45) Date of Patent: *Oct. 22, 2019

(54) SYSTEMS AND METHODS FOR PROVIDING AUGMENTED REALITY OVERLAYS

(71) Applicant: Facebook, Inc., Menlo Park, CA (US)

(72) Inventors: John Samuel Barnett, Newark, CA (US); Dantley Davis, Morgan Hill, CA (US); Congxi Lu, San Jose, CA (US); Jonathan Morton, Redwood City, CA (US); Peter Vajda, Palo Alto, CA (US); Joshua Charles Harris, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,927

(22) Filed: Feb. 1, 2019

(65) Prior Publication Data

US 2019/0171867 A1 Jun. 6, 2019

Related U.S. Application Data

(63) Continuation of application No. 15/849,577, filed on Dec. 20, 2017, now Pat. No. 10,229,312.

(Continued)

(51) Int. Cl.
| | |
|---|---|
| *G06K 9/00* | (2006.01) |
| *G06N 20/00* | (2019.01) |
| *G06Q 50/00* | (2012.01) |
| *G06T 5/00* | (2006.01) |
| *G06T 7/70* | (2017.01) |
| *G06K 9/66* | (2006.01) |

(Continued)

(52) U.S. Cl.
CPC ..... *G06K 9/00288* (2013.01); *G06K 9/00671* (2013.01); *G06K 9/66* (2013.01); *G06N 20/00* (2019.01); *G06Q 50/01* (2013.01); *G06T 5/002* (2013.01); *G06T 7/70* (2017.01); *G06T 11/00* (2013.01); *G06T 11/60* (2013.01)

(58) Field of Classification Search
CPC .................................................. G06T 19/006
See application file for complete search history.

(56) References Cited

U.S. PATENT DOCUMENTS

| | | | |
|---|---|---|---|
| 8,606,645 | B1 | 12/2013 | Applefeld |
| 9,396,354 | B1 | 7/2016 | Murphy |

(Continued)

FOREIGN PATENT DOCUMENTS

| | | |
|---|---|---|
| EP | 1388802 | 2/2004 |
| KR | 10-2014-0110584 | 9/2014 |
| KR | 10-2014-0128654 | 11/2014 |

OTHER PUBLICATIONS

European Patent Application No. 17210831, Search Report dated Mar. 19, 2018.

(Continued)

*Primary Examiner* — Phi Hoang
(74) *Attorney, Agent, or Firm* — Sheppard Mullin Richter & Hampton LLP

(57) ABSTRACT

Systems, methods, and non-transitory computer-readable media can identify one or more objects depicted in a camera view of a camera application displayed on a display of a user device. An augmented reality overlay is determined based on the one or more objects identified in the camera view. The camera view is modified based on the augmented reality overlay.

20 Claims, 7 Drawing Sheets

Related U.S. Application Data

(60) Provisional application No. 62/441,091, filed on Dec. 30, 2016.

(51) Int. Cl.
   *G06T 11/60* (2006.01)
   *G06T 11/00* (2006.01)

(56) References Cited

U.S. PATENT DOCUMENTS

| | | |
|---|---|---|
| 2009/0216446 A1 | 8/2009 | Ma |
| 2013/0278631 A1 | 10/2013 | Border |
| 2014/0086493 A1 | 3/2014 | Kothari |
| 2014/0253592 A1 | 9/2014 | Cho |
| 2015/0109338 A1 | 4/2015 | McKinnon |
| 2015/0113661 A1 | 4/2015 | Mishra |
| 2016/0294781 A1 | 10/2016 | Ninan |
| 2016/0373454 A1 | 12/2016 | Ball |
| 2016/0381064 A1 | 12/2016 | Chan |
| 2017/0188173 A1 | 6/2017 | Ranieri |
| 2018/0114098 A1 | 4/2018 | Desai |
| 2018/0143756 A1 | 5/2018 | Mildrew |
| 2018/0150727 A1 | 5/2018 | Farooqi |

OTHER PUBLICATIONS

International Application No. PCT/US2017/067986, International Search Report and Written Opinion dated Oct. 5, 2018.
International Application No. PCT/US2017/068014, International Search Report and Written Opinion dated Apr. 16, 2018.

SYSTEMS AND METHODS FOR PROVIDING AUGMENTED REALITY OVERLAYS

CROSS-REFERENCE TO RELATED APPLICATIONS

This application is a continuation of U.S. application Ser. No. 15/849,577, filed on Dec. 20, 2017 and entitled "SYSTEMS AND METHODS FOR PROVIDING AUGMENTED REALITY OVERLAYS" which claims priority to U.S. Provisional Patent Application No. 62/441,091, filed on Dec. 30, 2016 and entitled "SYSTEMS AND METHODS FOR PROVIDING AUGMENTED REALITY OVERLAYS", which are incorporated in their entireties herein by reference.

FIELD OF THE INVENTION

The present technology relates to the field of augmented reality. More particularly, the present technology relates to systems and methods for providing augmented reality overlays.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Social networking systems may have access to significant amounts of data. For example, a social networking system may have access to data about users on the social networking system, content posted to the social networking system, and user interactions with content posted to the social networking system. User experience associated with a social networking system can be enhanced using data available to the social networking system. When knowledge of users, content, and user interactions on the social networking system is gained, features, services, and other tools offered through the social networking system can be optimized to increase user interest in and engagement with the social networking system.

SUMMARY

Various embodiments of the present disclosure can include systems, methods, and non-transitory computer readable media configured to identify one or more objects depicted in a camera view of a camera application displayed on a display of a user device. An augmented reality overlay is determined based on the one or more objects identified in the camera view. The camera view is modified based on the augmented reality overlay.

In an embodiment, the one or more objects depicted in the camera view are identified based on machine learning techniques.

In an embodiment, user location information associated with the user device is received. The one or more objects depicted in the camera view are identified based on the user location information.

In an embodiment, one or more machine learning models associated with the user location information are downloaded to the user device. The one or more objects depicted in the camera view are identified based on the one or more machine learning models.

In an embodiment, the augmented reality overlay comprises context information associated with an object of the one or more objects depicted in the camera view.

In an embodiment, the context information comprises social networking system information associated with the object.

In an embodiment, the social networking system information comprises one or more content items associated with the object posted by users of a social networking system.

In an embodiment, the augmented reality overlay comprises an interactive augmented reality object that appears to interact with an object of the one or more objects depicted in the camera view.

In an embodiment, the interactive augmented reality object is selected based on an association with the object.

In an embodiment, the determining the augmented reality overlay comprises presenting a plurality of augmented reality overlays to a user, and receiving a selection of an augmented reality overlay from the plurality of augmented reality overlays.

Various embodiments of the present disclosure can include systems, methods, and non-transitory computer readable media configured to identify a first user depicted in image content captured by a second user. It is determined that the first user should be obscured in the image content based on privacy settings. The image content is modified to obscure the first user.

In an embodiment, the image content comprises a camera view of a camera application on a user device.

In an embodiment, the image content comprises an image or a video being uploaded to a social networking system by the second user.

In an embodiment, the first user is identified based on automated facial recognition techniques.

In an embodiment, the privacy settings comprise privacy settings associated with the first user on a social networking system.

In an embodiment, the privacy settings associated with the first user no the social networking system comprise a social graph requirement.

In an embodiment, the determining that the first user should be obscured comprises determining that the second user is not a connection or a connection of a connection of the first user on the social networking system.

In an embodiment, the privacy settings comprise privacy settings associated with the second user on a social networking system.

In an embodiment, the determining that the first user should be obscured comprises determining that the first user is not a connection or a connection of a connection of the second user on the social networking system.

In an embodiment, the privacy settings comprise a location-based privacy setting, and the determination that the first user should be obscured is made based on location information associated with the image content.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
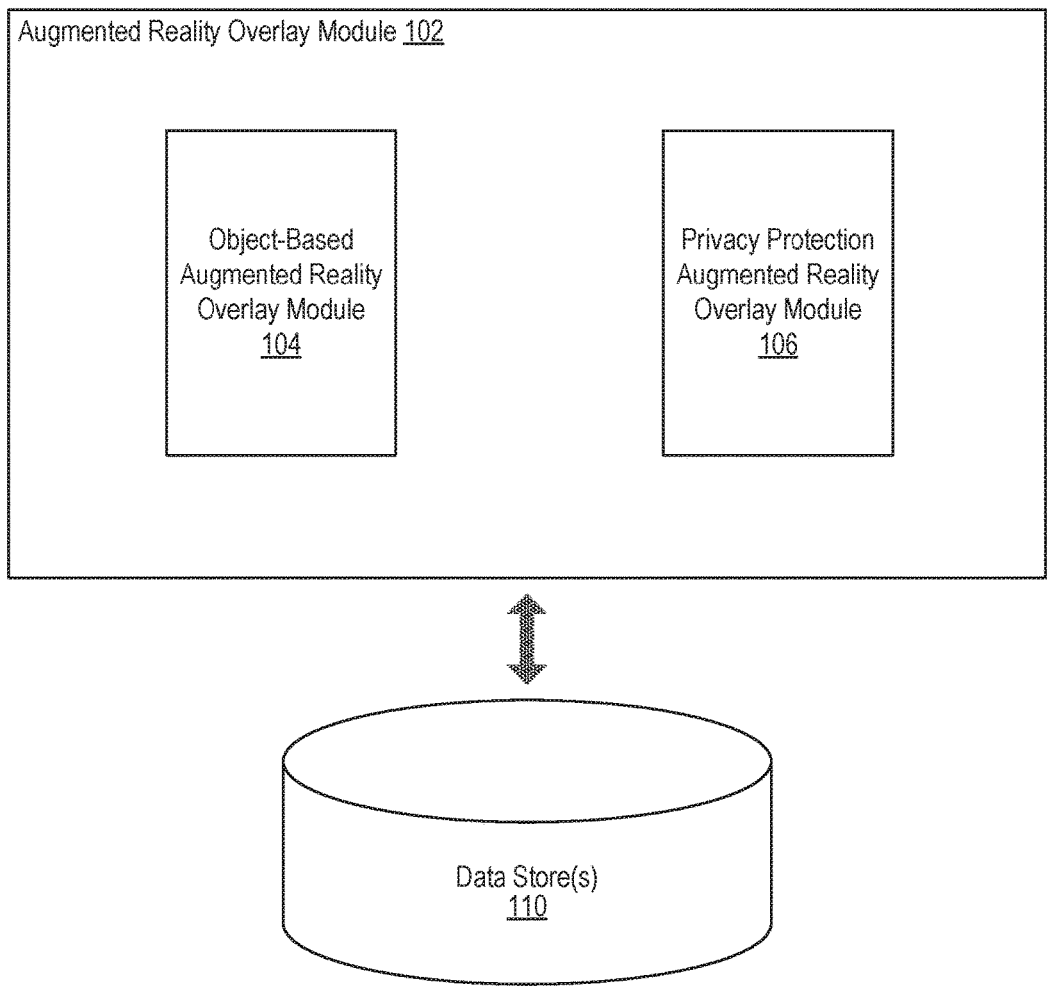
FIG. 1 illustrates an example system including an augmented reality overlay module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Augmented Reality Overlays

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Social networking systems may have access to significant amounts of data. For example, a social networking system may have access to data about users on the social networking system, content posted to the social networking system, and user interactions with content posted to the social networking system. User experience associated with a social networking system can be enhanced using data available to the social networking system. When knowledge of users, content, and user interaction on the social networking system is gained, features, services, and other tools offered through the social networking system can be optimized to increase user interest in and engagement with the social networking system.

It continues to be an important interest for a social networking system to provide users with tools to easily create and share interesting, high quality content to the social networking system. Such tools can lead to greater numbers of interesting content posts on the social networking system. Greater numbers of interesting content posts lead to greater engagement and interaction on the social networking system. However, it can be difficult to provide users with such tools. For example, in certain conventional approaches, tools provided with the intent of facilitating creation of interesting content may be unintuitive and difficult to use. Furthermore, conventional approaches generally fail to provide users with opportunities and reminders to engage with the social networking system, and create interesting content for the social networking system, while simultaneously engaging with real-world experiences and surroundings. It can also be a challenge, in certain circumstances, to encourage greater content generation by users while protecting privacy interests of other users on the social networking system.

An improved approach rooted in computer technology overcomes the foregoing and other disadvantages associated with conventional approaches specifically arising in the realm of computer technology. In some embodiments, users may be provided with augmented reality overlays which modify a camera view presented to a user in a camera application. When a user opens a camera application on his or her computing device, such as a mobile device, the user can be presented with a camera view of image data that is currently being captured by a camera (e.g., a camera built into the user's mobile device). As the user moves his or her camera around, the camera view can be updated to reflect what is being captured by the camera. Throughout the present disclosure, the term "capturing" image data can be understood to include both transient presentation of image data through a camera view (e.g., display of surroundings through a viewfinder of a camera without any permanent or semi-permanent recordation of image data associated with the surroundings) as well as permanent or semi-permanent recording of image data presented through a camera view (e.g., recording a video, or taking a photo). In various embodiments, an augmented reality overlay can be imposed on the camera view to modify the camera view being presented to the user. For example, in certain embodiments, an augmented reality overlay can present information about objects depicted in the camera view. In another example, in various embodiments, an augmented reality overlay can be used to implement various privacy protection features, such as blurring and/or otherwise obscuring people depicted in the camera view. The augmented reality overlay can be used, for example, to provide the user with additional information about a user's surrounding area. In another example, a user can capture content (e.g., images and/or video) in which the images captured by the user's camera are modified by the augmented reality overlay. These concepts will be described in greater detail herein.

FIG. 1 illustrates an example system 100 including an example augmented reality overlay module 102, according to an embodiment of the present disclosure. The augmented reality overlay module 102 can be configured to provide one or more augmented reality overlays to modify image content captured by a camera. Image content can include, for example, a camera view presented within a camera application and/or images or videos. For example, a user may use a camera on the user's mobile device to capture images and/or videos. As the user moves the camera around, the image data being captured by the camera can be presented to the user in a camera view, for example, on a display of the user's mobile device. Augmented reality overlays can be applied to the camera view to modify the camera view.

In certain embodiments, one or more augmented reality overlays may be provided to a user based on objects detected in the camera view. For example, if a user's camera view depicts the Golden Gate Bridge, object detection or recognition techniques can be utilized to identify the Golden Gate Bridge, and to recommend one or more augmented reality overlays based on the identified object(s). In the example of the Golden Gate Bridge, an augmented reality overlay can be recommended to a user which can include, in one instance, a post-card-style frame that is imposed on the camera view that reads "Hello from the Golden Gate Bridge!" In another example, an augmented reality overlay may include historical information about the Golden Gate Bridge presented next to the Golden Gate Bridge within the camera view. The user can then record an image and/or a video which includes the augmented reality overlay.

In various embodiments, the augmented reality overlay module 102 can be configured to provide one or more augmented reality overlays to protect user privacy. Certain people may not wish to be captured in other users' images or videos. User privacy can be protected by implementing augmented reality overlays that obscure users that are captured in other users' image content (e.g., camera views, images, videos). In various embodiments, one or more augmented reality overlays can be provided based on user privacy settings. For example, a user can be given the ability to define privacy settings (e.g., by modifying privacy settings on the user's account on a social networking system). The user's privacy settings can be used to selectively obscure the user's face in other users' image content. For example, facial recognition techniques can be utilized to detect that a first user is present in a second user's camera view, image, and/or video. An augmented reality overlay can be generated to selectively obscure the first user's face based on the first user's privacy settings. In certain embodiments, privacy settings can include a social graph requirement. For example, the first user may have specified in his or her privacy settings that he or she only wishes to appear in other users' image content if the other user is a connection (e.g., a friend), or a connection of a connection (e.g., a friend of a friend), on a social networking system. If the second user is connected to the first user on a social networking system (e.g., a friend of the first user, a friend of a friend of the first user), the first user's face may remain unobscured. However, if the second user does not satisfy the social graph requirement in the first user's privacy settings, an augmented reality overlay may be provided which obscures the first user's face and other identifying characteristics in the second user's camera view, and/or in any images or videos captured by the second user.

As shown in the example of FIG. 1, the augmented reality overlay module 102 can include an object-based augmented reality overlay module 104 and a privacy protection augmented reality overlay module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the augmented reality overlay module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the augmented reality overlay module 102 can be implemented, in part or in whole, as software running on one or more computing devices or systems, such as on a user or client computing device. In one example, the augmented reality overlay module 102 or at least a portion thereof can be implemented as or within an application (e.g., app), a program, or an applet, etc., running on a user computing device or a client computing system, such as the user device 610 of FIG. 6. In another example, the augmented reality overlay module 102 or at least a portion thereof can be implemented using one or more computing devices or systems that include one or more servers, such as network servers or cloud servers. In some instances, the augmented reality overlay module 102 can, in part or in whole, be implemented within or configured to operate in conjunction with a social networking system (or service), such as the social networking system 630 of FIG. 6.

The augmented reality overlay module 102 can be configured to communicate and/or operate with the at least one data store 110, as shown in the example system 100. The at least one data store 110 can be configured to store and maintain various types of data. For example, the data store 110 can store information describing various content that has been posted by users of a social networking system. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some embodiments, the data store 110 can store information that is utilized by the augmented reality overlay module 102. For example, the data store 110 can store one or more augmented reality overlays, one or more object recognition machine learning models, one or more facial recognition models, user privacy settings, and the like. It is contemplated that there can be many variations or other possibilities.

The object-based augmented reality overlay module 104 can be configured to provide one or more augmented reality overlays based on objects detected in a user's camera view. In certain embodiments, objects depicted in a user's camera view can be detected using automated object recognition techniques. For example, one or more machine learning models can be trained to identify objects depicted in a user's camera view. In certain embodiments, user location information can be utilized to assist in determining what objects are being depicted in a user's camera view. For example, if a user is located in a particular location, objects that are specific to other locations (e.g., landmarks that are far away from the user's current location) can be removed from consideration. One or more augmented reality overlays can be determined based on objects detected in a user's camera view and provided to a user for potential selection and application. For example, augmented reality overlays can be provided which present additional information about objects depicted in the user's camera view. In another example, augmented reality overlays can include interactive augmented reality objects that appear to interact with objects depicted in the user's camera view. In certain embodiments, augmented reality overlays can be presented based on social networking system information, such as information about a user's friends on the social networking system or content posted by the user's friends on the social networking system. If multiple augmented reality overlays are identified based on objects depicted in a camera view, a user can select one to be applied to his or her camera view. The user can capture images and/or video which include the augmented reality overlay applied to the camera view. The object-based augmented reality overlay module 104 will be described in greater detail herein.

The privacy protection augmented reality overlay module 106 can be configured to provide one or more augmented reality overlays which obscure one or more users detected in image content. The privacy protection augmented reality overlay module 106 can provide one or more augmented reality overlays which obscure one or more users based on privacy settings. The privacy settings can be privacy settings associated with a capturing user (i.e., the user viewing a camera view within a camera application and/or capturing images or video) and/or a depicted user (i.e., a user that is being depicted in the capturing user's camera view, image, and/or video). Automated facial recognition techniques can be used to identify users depicted in image content. The capturing user's privacy settings and/or any depicted users' privacy settings can automatically be applied by applying an augmented reality overlay in which one or more depicted users' faces or other identifying physical characteristics are obscured based on privacy settings. For example, if a first user has specified in his or her privacy settings that he or she would only like to appear in his or her friends' image content, the first user's face can be obscured any time he or she is identified as being depicted in another user's image content if the other user is not a friend of the first user on a social networking system. The privacy protection augmented reality overlay module 106 will be described in greater detail herein.

Figure 2:
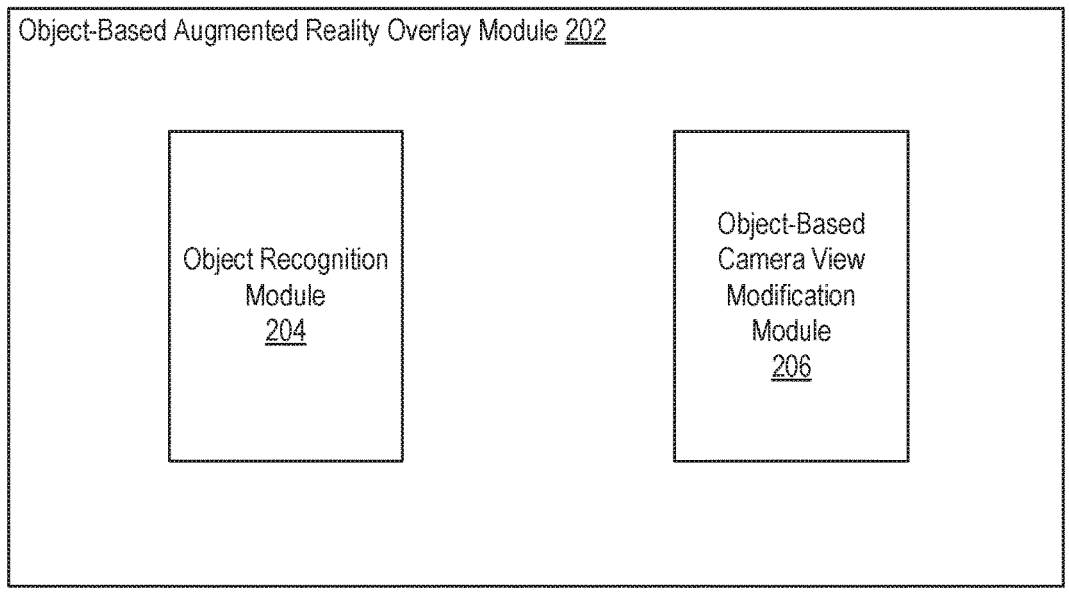
FIG. 2 illustrates an example object-based augmented reality overlay module, according to an embodiment of the present disclosure.

FIG. 2 illustrates an object-based augmented reality overlay module 202, according to an embodiment of the present disclosure. In some embodiments, the object-based augmented reality overlay module 104 of FIG. 1 can be implemented as the object-based augmented reality overlay module 202. As shown in the example of FIG. 2, the object-based augmented reality overlay module 202 can include an object recognition module 204 and an object-based camera view modification module 206.

The object recognition module 204 can be configured to recognize one or more objects depicted in a user's camera view. In various embodiments, machine learning techniques can be utilized to automatically recognize objects depicted in a user's camera view. It can be appreciated that in order to provide a user with an augmented reality overlay on the user's camera view, objects may need to be detected relatively quickly (e.g., in real time or near real time). Various features can be implemented to facilitate efficient and timely automated object recognition. In certain embodiments, location information associated with a capturing user can be used to narrow a corpus of objects potentially depicted in the user's camera view. In other words, certain objects can be eliminated from consideration based on location information. For example, if a user is currently located in San Francisco, it is at least highly unlikely that the user's camera view includes the Empire State Building. User location information can be obtained in a variety of ways, including, for example, GPS information for a user's mobile device, Bluetooth beacons, near-field communications devices, and/or other devices that can communicate with a user's mobile device to determine user location based on proximity, and the like.

In certain embodiments, a plurality of machine learning models can be trained, where each machine learning model is associated with a particular geographic region such that each machine learning model is trained to identify objects associated with the particular geographic region. Geographic regions may be specified in varying levels of granularity. For example, a machine learning model associated with a particular building may be trained to identify objects within that building (e.g., a machine learning model associated with a particular art museum can be trained to identify pieces contained in the art museum). Another machine learning model associated with a particular city may be trained to identify landmarks within that city. Based on a user's location information, various machine learning models can be downloaded to the user's mobile device such that object recognition can be performed locally on the user's mobile device using the downloaded machine learning models. For example, if a user is detected as being in the city of San Francisco, one or more machine learning models associated with San Francisco can be downloaded to the user's mobile device. These machine learning models can include a machine learning model associated with San Francisco, a machine learning model associated with Northern California, a machine learning model associated with a particular building in San Francisco that a user has entered, etc. As the user's location changes, machine learning models associated with previous location information can be removed and replaced with machine learning models associated with the user's current location.

The object-based camera view modification module 206 can be configured to provide one or more augmented reality overlays based on objects detected in the user's camera view for modification of the user's camera view. Augmented reality overlays can take various forms and provide various types of effects and/or modifications. For example, in one embodiment, an augmented reality overlay can be as simple as a frame around the camera view based on the user's location and/or one or more objects depicted in the user's camera view. For example, if it is detected that the user is at the Golden Gate Bridge, and/or the Golden Gate Bridge is depicted in the user's camera view, a frame resembling a post-card can be applied to the user's camera view with the words "Hello from the Golden Gate Bridge!" In certain embodiments, augmented reality overlays can present a two-dimensional effect (e.g., a post-card style frame). In certain embodiments, augmented reality overlays can present a three-dimensional effect (e.g., a creature moving through/interacting with buildings in a skyline).

In another example, an augmented reality overlay can provide context information about one or more objects depicted in a user's camera view. For example, if a user is standing on a cliff overlooking a city, the user can scan his or her camera to bring various landmarks into and out of the camera view. As a landmark enters the camera view, information about the landmark can be presented in the user's camera view. Context information can also include social networking system information. For example, if a landmark comes into a user's camera view, the user can be presented with other social networking system users that have checked-in at the landmark (e.g., the user's friends on the social networking system). In another example, social networking system information can include images and/or videos captured by other users on the social networking system (e.g., the user's friends on the social networking system) that include the landmark. It may be overwhelming to be presented with context information for each and every object detected in a user's camera view. As such, in certain embodiments, context information may remain hidden for one or more objects in a user's camera view, and can be presented upon performance of a particular gesture by the user applied to an interface presenting the camera view. For example, if a user taps on an object, or circles an object with his or her finger on a touchscreen display, context information for that object may be displayed. The user can then perform another gesture to hide the context information.

In certain embodiments, an augmented reality overlay can include one or more interactive augmented reality objects which interact with one or more objects depicted in a camera view. Such objects can be animations presenting video, audio, or both. For example, if a skyline is detected in a camera view, an augmented reality overlay in the form of an animation can be presented which makes it appear as if a large creature is rampaging through the city skyline. Augmented reality overlays can be selected based on types of objects depicted in a camera view. For example, any skyline may result in recommendation and/or inclusion of an augmented reality overlay of a generic monster rampaging through the skyline. Augmented reality overlays may also be selected based on specific objects identified in a camera view, e.g., a specific landmark. For example, if the Empire State Building is depicted, an augmented reality overlay including King Kong climbing the Empire State Building may be presented to a user for potential selection, whereas if the Tokyo Tower is depicted, an augmented reality overlay including Godzilla climbing the Tokyo Tower can be presented to the user for potential selection. While some examples have been provided, interactive augmented reality objects which interact with one or more objects depicted in a camera view can be presented in any form, theme, manner, or style.

When an augmented reality overlay is applied to a user's camera view, the user can capture images and/or videos of the user's surroundings or environment that include the augmented reality overlay. In certain embodiments, users can also publish live broadcasts (for example, to a social networking system) that include one or more augmented reality overlays applied to the live broadcast. If there are multiple augmented reality overlays identified as available (e.g., multiple augmented reality overlays are identified based on objects detected in the camera view), a user can be presented with the overlays and prompted to select one to apply to the user's camera view.

Various examples have been provided in which image data is captured by a camera on a user's mobile device. However, it should be appreciated that image data presented in a camera view can be captured by any camera. For example, in various embodiments, a camera on a drone can be used to capture image data. The image data can be relayed back to a user's mobile device or other display device for presentation in a camera view. The camera view can be modified using one or more augmented reality overlays, as described herein.

Figure 3:
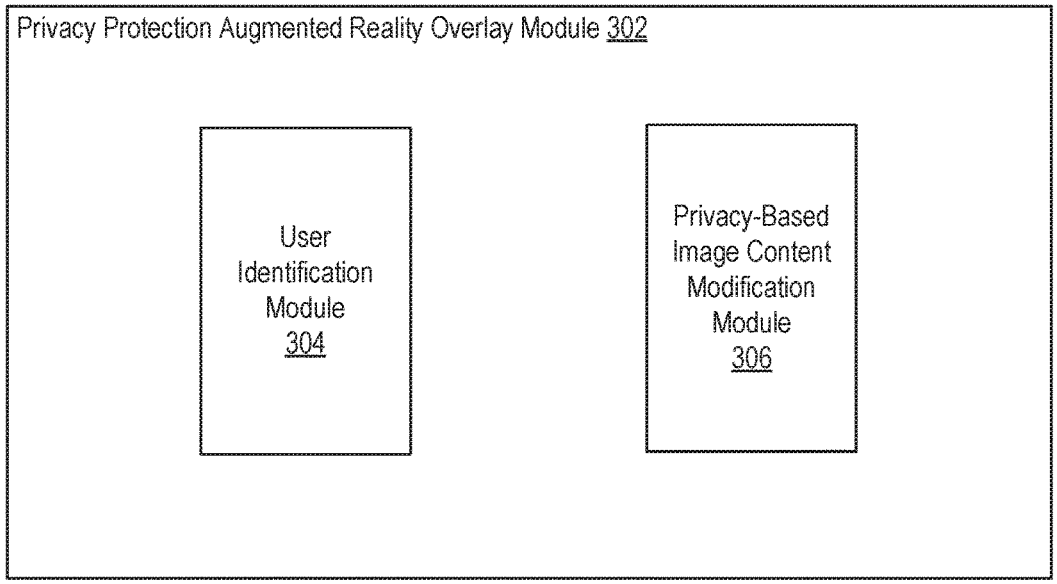
FIG. 3 illustrates an example privacy protection augmented reality overlay module, according to an embodiment of the present disclosure.

FIG. 3 illustrates a privacy protection augmented reality overlay module 302, according to an embodiment of the present disclosure. In some embodiments, the privacy protection augmented reality overlay module 106 of FIG. 1 can be implemented as the privacy protection augmented reality overlay module 302. As shown in the example of FIG. 3, the privacy protection augmented reality overlay module 302 can include a user identification module 304 and a privacy-based image content modification module 306.

The user identification module 304 can be configured to identify one or more users depicted in image content captured by a capturing user. Image content can include, for example, a camera view presented in a camera application on the capturing user's device, an image captured by the user, and/or a video captured by the user. Automated facial recognition techniques can be used to identify users depicted in image content.

The privacy-based image content modification module 306 can be configured to modify image content based on privacy settings. For example, image content can be modified by obscuring (or concealing, anonymizing, etc.) one or more users, or their identities, based on privacy settings. A user can be obscured by blurring the user's face or placing a mask or a sticker over the user's face, concealing other physical features associated with the user, to name a few examples. In certain embodiments, image content can be modified by applying an augmented reality overlay to the image content. Privacy settings can include privacy settings of a capturing user (i.e., a user capturing image content) and/or the privacy settings of a depicted user (i.e., a user that is depicted in image content). In certain embodiments, privacy settings can include social graph requirements. Social graph requirements may specify a threshold number of degrees of separation on a social networking system. For example, a capturing user may wish to depict only users that are friends of the capturing user on the social networking system. Similarly, a depicted user may wish to be included in image content captured by either the depicted user's friends or friends of the depicted user's friends on the social networking system, but not in image content captured by other users. When a first user captures image content which depicts a second user, the second user can be identified using, for example, automated facial recognition. Privacy settings associated with the second user can be analyzed and applied. For example, if the second user has specified that he or she would only like to be included in image content captured by friends of the second user on the social networking system, a social graph of the second user can be analyzed to determine whether or not the first user is a friend of the second user on the social networking system. If the first user is a friend, the second user is not obscured in the image content. However, if the first user is not a friend of the second user, the second user is obscured.

In certain embodiments, privacy settings can include location-specific and/or event-specific privacy settings. For example, if a user wishes to attend an event, he or she may be required to accept the event's privacy settings, which may require, for example, that all users accept that they may be shown in images or videos taken at the event. In another example, a particular user may specify that he or she is willing to be shown in any image content captured at a particular location, regardless of whether or not the capturing user is connected to the user on a social networking system. Conversely, the user may also specify that he or she would not like to be shown in any image content captured at a second location, regardless of whether or not the capturing user is connected to the user on the social networking system.

In certain embodiments, obscuring of a user can occur in real-time (or near real-time) as image content is being captured. For example, when a capturing user is viewing a camera view on a camera application, users in the camera view can be identified in real-time, and the determination as to whether or not to obscure each user can occur in real-time. The camera view can be modified using an augmented reality overlay that obscures users within the camera view.

In certain embodiments, obscuring of a user can occur after image content has been captured. For example, if a capturing user captures an image in which other users are depicted, the image can be analyzed for privacy settings when the capturing user attempts to upload the image to a social networking system. When the user attempts to upload the image, the image can be analyzed to identify all users in the image. One or more of the users depicted in the image can be obscured based on privacy settings for all depicted users and/or the capturing user.

Figure 4:
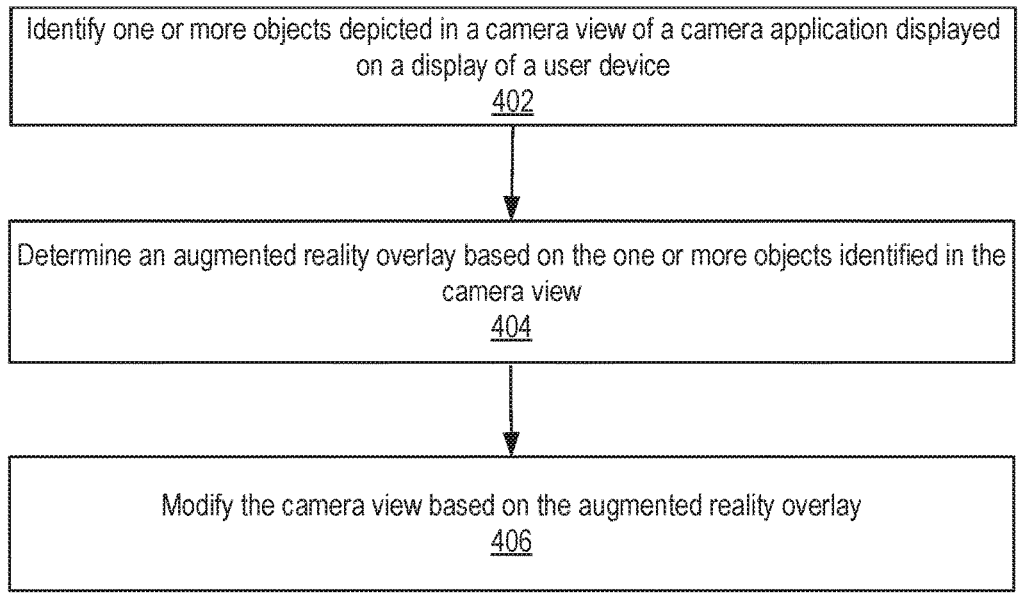
FIG. 4 illustrates an example method associated with providing an augmented reality overlay based on object recognition, according to an embodiment of the present disclosure.

FIG. 4 illustrates an example method 400 associated with modifying a camera view with an augmented reality overlay based on objects identified in the camera view, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can identify one or more objects depicted in a camera view of a camera application displayed on a display of a user device. At block 404, the example method 400 can determine an augmented reality overlay based on the one or more objects identified in the camera view. At block 406, the example method 400 can modify the camera view based on the augmented reality overlay.

Figure 5:
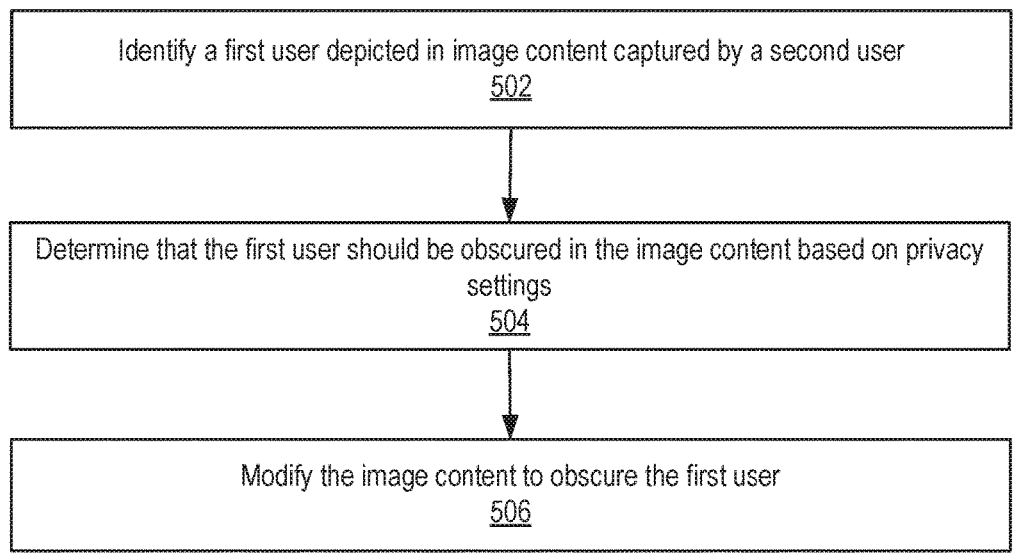
FIG. 5 illustrates an example method associated with obscuring a user in image content based on privacy settings, according to an embodiment of the present disclosure.

FIG. 5 illustrates an example method 500 associated with obscuring a first user depicted in image content based on privacy settings, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can identify a first user depicted in image content captured by a second user. At block 504, the example method 500 can determine that the first user should be obscured in the image content based on privacy settings. At block 506, the example method 500 can modify the image content to obscure the first user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
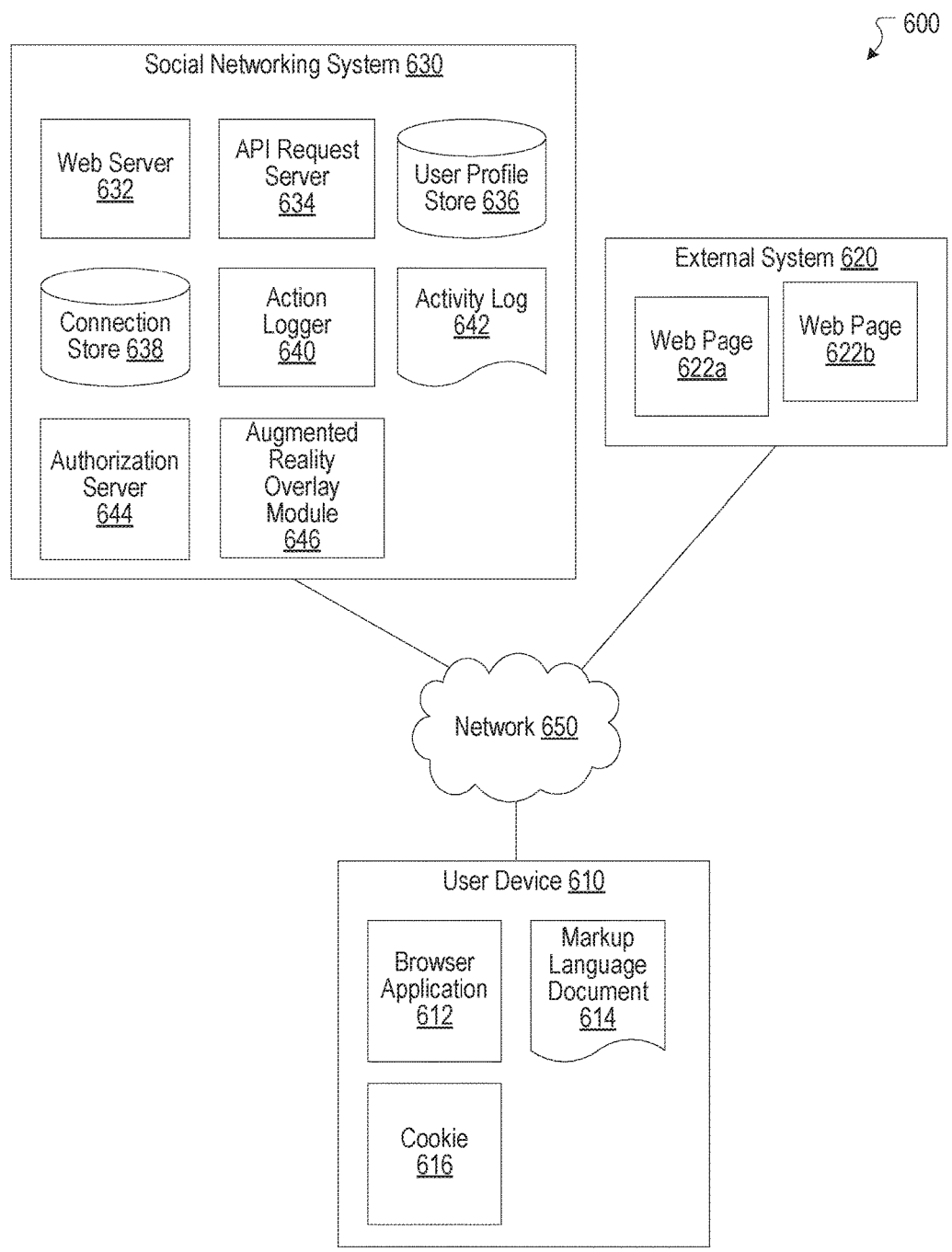
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post"

to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an augmented reality overlay module 646. The augmented reality overlay module 646 can, for example, be implemented as the augmented reality overlay module 102, as discussed in more detail herein. As discussed previously, it should be appreciated that there can be many variations or other possibilities. For example, in some embodiments, one or more functionalities of the augmented reality overlay module 646 can be implemented in the user device 610.

Hardware Implementation

Figure 7:
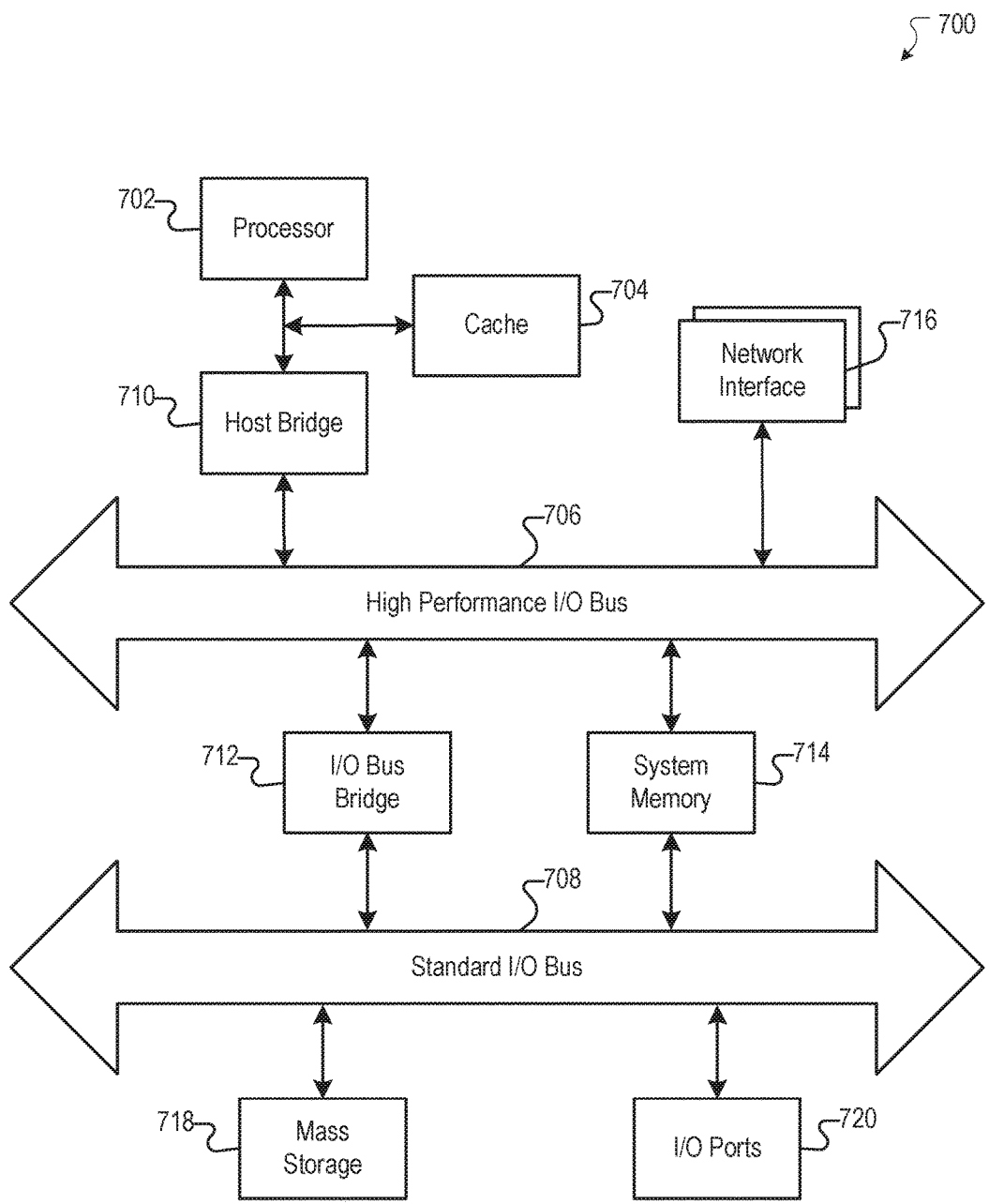
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, user location information from a first user device;
selecting, by the computing system, a first object recognition machine learning model from a plurality of object recognition machine learning models based on the user location information; and
providing, by the computing system, the first object recognition machine learning model to the first user device, wherein one or more objects depicted through the first user device are identified using the provided first object recognition machine learning model.

2. The computer-implemented method of claim 1, wherein a plurality of machine learning models associated with the user location information are downloaded to the first user device, the plurality of machine learning models including the first object recognition machine learning model.

3. The computer-implemented method of claim 1, wherein an augmented reality overlay is identified based on the one or more objects, the augmented reality overlay being used to modify a camera interface on the first user device.

4. The computer-implemented method of claim 3, wherein the augmented reality overlay comprises context information associated with an object of the one or more objects depicted through the first user device.

5. The computer-implemented method of claim 4, wherein the context information comprises social networking system information associated with the object.

6. The computer-implemented method of claim 5, wherein the social networking system information comprises one or more content items associated with the object posted by users of a social networking system.

7. The computer-implemented method of claim 3, wherein the augmented reality overlay comprises an interactive augmented reality object that appears to interact with an object of the one or more objects depicted through the first user device.

8. The computer-implemented method of claim 7, wherein the interactive augmented reality object is selected based on an association with the object.

9. The computer-implemented method of claim 3, wherein the augmented reality overlay is identified based on a user selection selecting the augmented reality overlay from a plurality of augmented reality overlays.

10. The computer-implemented method of claim 1, further comprising:
receiving updated user location information from the first user device;
selecting a second object recognition machine learning model from a plurality of object recognition machine learning models based on the updated user location information; and
providing the second object recognition machine learning model to the first user device for identifying objects depicted through the first user device.

11. A system comprising:
at least one processor; and
a memory storing instructions that, when executed by the at least one processor, cause the system to perform a method comprising:
receiving user location information from a first user device;
selecting a first object recognition machine learning model from a plurality of object recognition machine learning models based on the user location information; and
providing the first object recognition machine learning model to the first user device, wherein one or more objects depicted through the first user device are identified using the provided first object recognition machine learning model.

12. The system of claim 11, wherein a plurality of machine learning models associated with the user location information are downloaded to the first user device, the plurality of machine learning models including the first object recognition machine learning model.

13. The system of claim 11, wherein an augmented reality overlay is identified based on the one or more objects, the augmented reality overlay being used to modify a camera interface on the first user device.

14. The system of claim 13, wherein the augmented reality overlay comprises context information associated with an object of the one or more objects depicted through the first user device.

15. The system of claim 14, wherein the context information comprises social networking system information associated with the object.

16. A non-transitory computer-readable storage medium including instructions that, when executed by at least one processor of a computing system, cause the computing system to perform a method comprising:

receiving user location information from a first user device;

selecting a first object recognition machine learning model from a plurality of object recognition machine learning models based on the user location information; and providing the first object recognition machine learning model to the first user device, wherein one or more objects depicted through the first user device are identified using the provided first object recognition machine learning model.

17. The non-transitory computer-readable storage medium of claim 16, wherein a plurality of machine learning models associated with the user location information are downloaded to the first user device, the plurality of machine learning models including the first object recognition machine learning model.

18. The non-transitory computer-readable storage medium of claim 16, wherein an augmented reality overlay is identified based on the one or more objects, the augmented reality overlay being used to modify a camera interface on the first user device.

19. The non-transitory computer-readable storage medium of claim 18, wherein the augmented reality overlay comprises context information associated with an object of the one or more objects depicted through the first user device.

20. The non-transitory computer-readable storage medium of claim 19, wherein the context information comprises social networking system information associated with the object.

* * * * *